(12) United States Patent
Mohanan et al.

(10) Patent No.: US 10,792,648 B2
(45) Date of Patent: Oct. 6, 2020

(54) MIXED METAL LARGE CRYSTAL MOLECULAR SIEVE CATALYST COMPOSITIONS, CATALYTIC ARTICLES, SYSTEMS AND METHODS

(71) Applicant: BASF Corporation, Florham Park, NJ (US)

(72) Inventors: Jaya L. Mohanan, Edison, NJ (US); Jeff Yang, Glen Rock, NJ (US); Patrick Burk, Freehold, NJ (US); Kenneth E. Voss, Somerville, NJ (US)

(73) Assignee: BASF Corporation, Florham Park, NJ (US)

( * ) Notice: Subject to any disclaimer, the term of this patent is extended or adjusted under 35 U.S.C. 154(b) by 152 days.

(21) Appl. No.: 15/522,440

(22) PCT Filed: Oct. 30, 2015

(86) PCT No.: PCT/US2015/058393
§ 371 (c)(1),
(2) Date: Apr. 27, 2017

(87) PCT Pub. No.: WO2016/070090
PCT Pub. Date: May 6, 2016

(65) Prior Publication Data
US 2017/0333883 A1 Nov. 23, 2017

Related U.S. Application Data

(60) Provisional application No. 62/072,687, filed on Oct. 30, 2014.

(51) Int. Cl.
*B01J 29/06* (2006.01)
*B01J 29/76* (2006.01)
*B01D 53/94* (2006.01)
*B01J 29/80* (2006.01)
*B01D 53/86* (2006.01)
*B01J 37/02* (2006.01)
*B01J 35/00* (2006.01)
*C01B 39/48* (2006.01)
(Continued)

(52) U.S. Cl.
CPC ........ *B01J 29/763* (2013.01); *B01D 53/8628* (2013.01); *B01D 53/9418* (2013.01); *B01J 29/76* (2013.01); *B01J 29/7638* (2013.01); *B01J 29/80* (2013.01); *B01J 29/83* (2013.01); *B01J 29/84* (2013.01); *B01J 29/85* (2013.01); *B01J 29/86* (2013.01); *B01J 29/87* (2013.01); *B01J 29/89* (2013.01); *B01J 35/002* (2013.01); *B01J 35/04* (2013.01); *B01J 37/0246* (2013.01); *B01J 37/0248* (2013.01); *C01B 39/48* (2013.01); *B01D 2255/20738* (2013.01); *B01D 2255/20761* (2013.01); *B01D 2255/50* (2013.01); *B01D 2255/9022* (2013.01); *B01D 2255/9032* (2013.01); *B01D 2255/9202* (2013.01); *B01D 2257/404* (2013.01); *B01J 35/0006* (2013.01); *B01J 37/0244* (2013.01); *B01J 2229/186* (2013.01)

(58) Field of Classification Search
CPC ............ B01D 53/8628; B01D 53/9418; B01D 2255/50; B01D 53/8631; B01D 53/9431; B01D 53/9427; B01D 53/9472; B01D 53/9468; B01D 2255/9022; B01D 2255/9032; B01D 2255/904; B01D 2255/9045; B01D 2255/9202; B01D 2257/402; B01D 2257/404; B01J 35/002; B01J 35/0006; B01J 35/04; B01J 35/37; B01J 35/0246; B01J 37/0244; B01J 37/0248; B01J 29/763; B01J 29/80; B01J 29/76; B01J 29/7638; B01J 29/83; B01J 29/84; B01J 29/85; B01J 29/86; B01J 29/87; B01J 29/89; B01J 2229/186; B01J 29/72
USPC ....... 502/60, 64, 66, 67, 69, 527.12, 527.24; 422/177; 423/212, 213.2, 213.5, 235, 423/239.1, 239.2
See application file for complete search history.

(56) References Cited

U.S. PATENT DOCUMENTS

| | | | | |
|---|---|---|---|---|
| 5,516,497 A | * | 5/1996 | Speronello | ......... B01D 53/9418 423/235 |
| 6,093,378 A | * | 7/2000 | Deeba | .................. B01D 53/945 423/213.5 |

(Continued)

FOREIGN PATENT DOCUMENTS

| | | | |
|---|---|---|---|
| WO | WO 2008/132452 | * | 11/2008 |
| WO | WO 2011/064186 | * | 6/2011 |
| WO | WO 2013/114172 | | 8/2013 |

OTHER PUBLICATIONS

Kwak, et al., "Excellent Activity and Selectivity of Cu-SSZ-13 in the Selective Catalytic Reduction of NOx with NH3," *Journal of Catalysis*, 2010, vol. 275, Issue 2, pp. 187-190.

*Primary Examiner* — Elizabeth D Wood
(74) *Attorney, Agent, or Firm* — Womble Bond Dickinson (US) LLP

(57) ABSTRACT

Described are compositions and catalytic articles comprising both a first molecular sieve promoted with copper and a second molecular sieve promoted with iron, the first and second molecular sieves having a d6r unit and the first molecular sieves having cubic shaped crystals with an average crystal size of about 0.5 to about 2 microns. The weight ratio of the copper-promoted molecular sieve to the iron-promoted molecular sieve can be about 1:1 to about 4:1. The catalytic articles are useful in methods and systems to catalyze the reduction of nitrogen oxides in the presence of a reductant.

35 Claims, 6 Drawing Sheets

(51) Int. Cl.
  *B01J 35/04*      (2006.01)
  *B01J 29/87*      (2006.01)
  *B01J 29/86*      (2006.01)
  *B01J 29/83*      (2006.01)
  *B01J 29/85*      (2006.01)
  *B01J 29/84*      (2006.01)
  *B01J 29/89*      (2006.01)

(56) References Cited

U.S. PATENT DOCUMENTS

| | | | |
|---|---|---|---|
| 9,242,238 B2* | 1/2016 | Mohanan | B01J 29/80 |
| 9,486,792 B2* | 11/2016 | Mohanan | B01J 29/80 |
| 2012/0093702 A1* | 4/2012 | Andersen | B01D 53/8628 |
| | | | 423/210 |
| 2012/0184429 A1* | 7/2012 | Andersen | B01D 53/9418 |
| | | | 502/61 |
| 2012/0208691 A1 | 8/2012 | Bull et al. | |
| 2013/0089494 A1 | 4/2013 | Reichinger et al. | |
| 2013/0136677 A1 | 5/2013 | Chandler et al. | |
| 2013/0280160 A1 | 10/2013 | Ariga et al. | |
| 2014/0112853 A1 | 4/2014 | Mohanan et al. | |
| 2014/0234206 A1 | 8/2014 | Trukhan et al. | |
| 2016/0038875 A1 | 2/2016 | Schuetze | |

\* cited by examiner

MIXED METAL LARGE CRYSTAL MOLECULAR SIEVE CATALYST COMPOSITIONS, CATALYTIC ARTICLES, SYSTEMS AND METHODS

FIELD OF THE INVENTION

The present invention relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

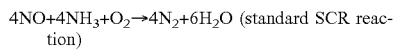
4NO+4NH$_3$+O$_2$→4N$_2$+6H$_2$O (standard SCR reaction)

2NO$_2$+4NH$_3$→3N$_2$+6H$_2$O (slow SCR reaction)

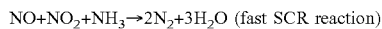
NO+NO$_2$+NH$_3$→2N$_2$+3H$_2$O (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Zeolites having 8-ring pore openings and double-six ring secondary building units, particularly those having cage-like structures, have recently been studied for use as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. For example, iron-promoted zeolite beta has been an effective commercial catalyst for the selective reduction of nitrogen oxides with ammonia. Unfortunately, it has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite.

Metal-promoted, particularly copper-promoted, aluminosilicate zeolites having the CHA structure type have recently solicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662. Prior to the discovery of metal promoted zeolites described in U.S. Pat. No. 7,601,662, while a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. The invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Even though the catalysts described in U.S. Pat. No. 7,601,662 exhibit excellent properties, rendering them useful e.g., in the context of SCR catalysis, there is always a desire for improved performance in extended and/or different temperature windows. One of the challenges of meeting current governmental (for example, Euro 6) $NO_x$ regulations is the improvement of low temperature performance of the existing Cu-SSZ13 based SCR catalysts. Accordingly, it would be beneficial to provide an SCR catalyst that has improved low and high temperature performance and lower $N_2O$ make versus current Cu-SSZ13-based SCR catalysts.

SUMMARY OF THE INVENTION

The present disclosure generally provides catalytic articles and catalyst systems comprising such catalytic articles. In particular, such articles and systems comprise an SCR catalyst comprising a combination of molecular sieves (e.g., zeolites).

In one aspect of the invention, a catalytic article comprising a substrate having at least one washcoat thereon so as to contain both a first molecular sieve promoted with copper and a second molecular sieve promoted with iron is provided, wherein the first and second molecular sieves have a d6r unit, and the first molecular sieve has cubic shaped crystals with an average crystal size of about 0.5 to about 2 microns, wherein the weight ratio of the copper-promoted molecular sieve to the iron-promoted molecular sieve is about 1:1 to about 4:1, the catalytic article effective to catalyze the reduction of nitrogen oxides in the presence of a reductant.

In certain embodiments, the first and second molecular sieves of the catalytic article have a structure type independently selected from the group consisting of AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In some embodiments, the first and second molecular sieves are 8-ring small pore molecular sieves independently selected from AEI, AFT, AFX, CHA, EAB, ERI, KFI, LEV, SAS, SAT, and SAV. For example, in certain embodiments, the first and second molecular sieves each have a structure type independently selected from AEI, CHA, and AFX (e.g., including, but not limited to, embodiments wherein each of the first and second molecular sieves have the CHA structure type).

Where the catalytic article comprises first and second molecular sieves having the CHA structure type, the sieves can, for example, be independently selected from an aluminosilicate zeolite, a borosilicate, a gallosilicate, a SAPO, an AlPO, a MeAPSO, and a MeAPO. In some embodiments, first and second molecular sieves having the CHA structure type can be independently selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

The weight ratio of the copper-promoted molecular sieve to the iron-promoted molecular sieve in the catalytic articles disclosed herein can, in some embodiments, be about 1:1 to 2:1 on a weight basis. The copper-promoted and iron-promoted molecular sieves can be in varying configurations with respect to one another. In some embodiments, they can be contained in the same washcoat and in some embodiments, they are in separate washcoats. In certain embodiments, the sieves promoted with copper and the sieves promoted with iron are in a laterally zoned or layered configuration with respect to one another or are in a uniform mixture with one another. In some embodiments, the catalytic articles are effective to catalyze the selective catalytic reduction of nitrogen oxides in the presence of a reductant at temperatures of 200° C. to 600° C.

In some embodiments, the first and second molecular sieves having the CHA structure type have a silica to alumina ratio of 10 to 50. The catalytic articles disclosed herein can, in certain embodiments, comprise copper present in an amount of about 0.1 to about 5 wt. %, specifically in an amount of about 0.5 to about 4 wt. %, and more specifically in an amount of about 1 to about 3 wt. %. The catalytic articles disclosed herein can, in certain embodiments, comprise iron present in an amount of about 0.1 to about 10 wt. % based on the overall weight of the washcoat. For example, in certain particular embodiments, the iron is present in an amount in the range of about 0.1 to about 5 wt. % or about 1 to about 3 wt. % based on the overall weight of the washcoat.

In certain embodiments, the first molecular sieves comprise sieves having an average crystal size of about 0.8 micron to about 1.2 micron. In some embodiments, the first molecular sieves have an average crystal size of about 1 micron. For example, in some embodiments, at least about 90% by weight, at least about 95% by weight, at least about 98% by weight, at least about 99% by weight, or at least about 99.5% by weight of the first molecular sieves have such crystal sizes.

The catalytic article can, in some embodiments, comprise second molecular sieves with cubic shaped crystals with an average crystal size of about 0.5 to about 2 microns. In some embodiments, the second molecular sieves comprise crystals with an average crystal size of about 0.8 micron to about 1.2 micron. In some embodiments, at least about 90% by weight, at least about 95% by weight, at least about 98% by weight, at least about 99% by weight, or at least about 99.5% by weight of the second molecular sieves have such crystal sizes.

In some embodiments, both the first and second molecular sieves comprise crystals with an average crystal size of about 0.8 micron to about 1.2 micron. In particular embodiments, the first and second molecular sieves comprise sieves having an average crystal size of about 1 micron. In some such embodiments, at least about 90% by weight, at least about 95% by weight, at least about 98% by weight, at least about 99% by weight, or at least about 99.5% by weight of the first and second molecular sieves have such crystal sizes.

The catalytic article generally comprises one or more washcoats, in the form of one or more layers deposited on a substrate. The substrate can vary; for example, in some embodiments, the substrate comprises a filter (e.g., a wall flow filter). In some embodiments, the substrate is a flow through substrate.

Another aspect of the invention is a method for selectively reducing nitrogen oxides ($NO_x$), comprising contacting a gas stream containing $NO_x$ with a selective catalytic reduction article comprising a first molecular sieve promoted with copper and a second molecular sieve promoted with iron, the first and second molecular sieves having a d6r unit and the first molecular sieves having cubic shaped crystals with an average crystal size of about 0.5 to about 2 microns, wherein the weight ratio of the copper-promoted molecular sieve to the iron-promoted molecular sieve is about 1:1 to about 4:1. In particular embodiments of this method, the second molecular sieves have cubic shaped crystals with a crystal size of about 0.5 to about 2 microns (e.g., wherein both the first and second molecular sieves have a crystal size of about 0.8 micron to about 1.2 micron). In some embodiments, the weight ratio of the copper-promoted molecular sieve to the iron-promoted molecular sieve is in the range of about 1:1 to about 2:1.

A further aspect of the invention is directed to an exhaust gas treatment system, such as a system for treating exhaust gas from a lean burn engine containing $NO_x$, comprising the catalytic article of various embodiments referenced herein above at least one other exhaust gas treatment component.

DETAILED DESCRIPTION OF THE PREFERRED EMBODIMENTS

Figure 1:
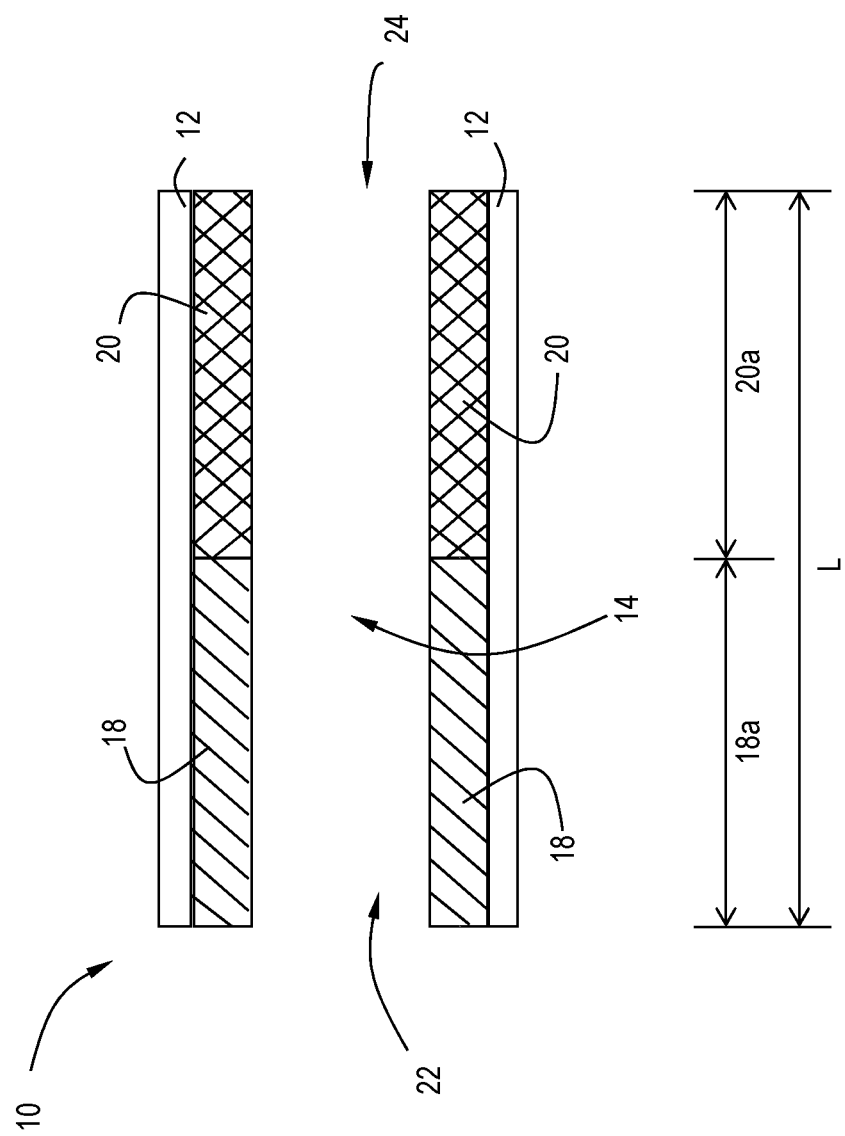
FIG. 1 shows a partial cross-sectional view of catalytic article according to one or more embodiments.

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. Any ranges cited herein are inclusive. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

The present disclosure provides an SCR catalyst having both improved high temperature performance and improved low temperature performance, particularly with respect to the current Cu-SSZ-13-based benchmark technology. The SCR catalyst disclosed herein also, in some embodiments, has lower $N_2O$ make compared to the current Cu-SSZ-13 based benchmark technology. In particular, embodiments of the invention comprise large crystal molecular sieves, methods for their preparation, catalytic articles including them, exhaust gas systems incorporating such catalytic articles, and methods of abating pollutants from exhaust gases using large crystal molecular sieves. It has surprisingly been found, as will be detailed more fully herein below, that large crystal molecular sieves are particularly suitable in exhaust gas purification catalyst components, in particular in the context of SCR catalytic components.

With respect to the terms used in this disclosure, the following definitions are provided.

As used herein, the term "catalyst" or "catalyst composition" or "catalyst material" refers to a material that promotes a reaction.

As used herein, the term "catalytic article" refers to a component that is used to promote a desired reaction. For example, a catalytic article may comprise a washcoat containing a catalyst, catalyst composition, or catalyst material on a substrate.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

The phrase "molecular sieve," as used herein, refers to framework materials such as zeolites and other framework materials (e.g. isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that defining the molecular sieves by their structure type is intended to include both molecular sieves having that structure type and any and all isotypic framework materials such as SAPO, ALPO and MeAPO materials having the same structure type.

In more specific embodiments, reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

Generally, molecular sieves, e.g. zeolites, are defined as aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

In one or more embodiments, the first and second molecular sieves comprises $SiO_4/AlO_4$ tetrahedra and are linked by common oxygen atoms to form a three-dimensional network. The first and second molecular sieves of one or more embodiments are differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. In one or more embodiments, the first and second molecular sieves comprise ring sizes of no larger than 12, including 6, 8, 10, and 12.

According to one or more embodiments, the first and second molecular sieves can be classified by means of the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve component comprises an 8-ring small pore aluminosilicate zeolite. As used herein, "small pore" refers to pore openings which are smaller than about 5 Angstroms, for example, from about 3 to about 5 Angstroms, such as on the order of ~3.8 Angstroms. The phrase "8-ring" zeolites refers to zeolites having pore openings defined by 8-member rings or smaller rings and double-six ring secondary building units, and having a cage-like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the first and second molecular sieves comprise d6r units. Thus, in one or more embodiments, the first and second molecular sieves have a structure type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the first and second molecular sieves have a structure type selected from the group consisting of CHA, AEI, AFX, ERI, KFI, LEV, and combinations thereof. In still further specific embodiments, the first and second molecular sieves have a structure type selected from CHA, AEI, and AFX. In one or more very specific embodiments, the first and second molecular sieves have the CHA structure type.

In one or more embodiments, the first and second molecular sieves are selected from an aluminosilicate zeolite, a borosilicate, a gallosilicate, a SAPO, an AlPO, a MeAPSO, and a MeAPO. In other specific embodiments, the first and second molecular sieves have the CHA structure type and are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6. It is noted that, where the structure and/or composition of the first and second molecular sieves are selected from a given list, the first and second molecular sieves may, in some embodiments, have the same (or similar) structure and/or composition and may, in other embodiments, have different structure and/or compositions selected from that list.

The first and second molecular sieves according to embodiments of the invention may be provided as a washcoat. The first and second molecular sieves provide a washcoat that is generally very porous. The average crystal size of the first molecular sieves is generally in the range of about 0.5 to about 2 microns. In some embodiments, both the first and second molecular sieves have average crystal sizes in the range of about 0.5 microns to about 2 microns. In specific embodiments, the first molecular sieves have an average crystal size of about 1 micron. In other specific embodiments, both the first and second molecular sieves have an average crystal size of about 1 micron. Average crystal sizes can be measured, for example, using microscopy, e.g., scanning electron microscopy (SEM).

As is apparent to one of ordinary skill in the art, the average crystal sizes of the first, and, in some embodiments, of the second, molecular sieves are significantly larger than those of molecular sieves having the CHA structure prepared according to conventional methods known in the art. Such conventionally prepared molecular sieves are known to have particle sizes (e.g., average particle sizes) less than about 0.5 μm.

Additionally, in one or more embodiments, the first molecular sieves comprise sieves in the form of cubic shaped crystals/crystallites (e.g., substantially in the form of cubic shaped crystals). In various embodiments, a majority of the first molecular sieves are in the form of cubic shaped crystals, e.g., at least about 75% by weight, at least about 90% by weight, at least about 95% by weight, at least about 98% by weight, or at least about 99% by weight of the molecular sieves are crystalline and/or cubic in shape. The terms "cubic" and "cubic shaped" are intended to have their standard definitions, e.g., having a three-dimensional shape, characterized by six square faces, three such faces meeting at each vertex. Although, in certain embodiments, all or a majority (e.g., at least about 90%, 95%, 98%, or 99% by weight) of the crystals are cubic, in some embodiments, a small fraction (e.g., about 10% or less, about 5% or less, about 2% or less, or about 1% or less) of the crystals may not meet the strict definition of "cubic." The cubic shaped crystals can, in some embodiments, share edges (while a majority are cubic, some crystals may have smoother edges and/or corners, as compared with perfect cubes, with some edge-to-edge connection). In other embodiments, both the first and second molecular sieves have cubic shaped crystals. Other (non-cubic) sieve materials that may be present in the samples disclosed herein (e.g., present in relatively small amounts, as referenced above) can have varying shapes, e.g., other (non-cubic) crystalline shapes, or can be amorphous. It is noted that, where crystal sizes and shapes are described herein, such sizes and shapes are reported after calcination, unless otherwise noted herein.

The ratio of silica to alumina of the molecular sieve components can vary over a wide range. In one or more embodiments, one or both of the molecular sieve components have a silica to alumina molar ratio (SAR) in the range of up to about 300, including about 5 to about 250; about 10 to about 200; about 2 to about 300; and about 5 to about 250. In one or more specific embodiments, one or both of the molecular sieve components have a silica to alumina molar ratio (SAR) in the range of about 10 to about 200, about 10 to about 100, about 10 to about 75, about 10 to about 60, or about 10 to about 50; about 15 to about 100, about 15 to about 75, about 15 to about 60, or about 15 to about 50; about 20 to about 100, about 20 to about 75, about 20 to about 60, or about 20 to about 50.

In one or more embodiments, the catalytic article comprises a substantially crystalline material. For example, one or more of the molecular sieve components disclosed herein can, in some embodiments, be present in the form of a highly crystalline material (e.g., at least about 75% by weight crystalline, at least about 80% by weight crystalline, at least about 85% by weight crystalline, at least about 90% by weight crystalline, at least about 95% by weight crystalline, at least about 98% by weight crystalline, at least about 99% by weight crystalline, or at least about 99.5% by weight crystalline). The synthesis of a molecular sieve varies according to the structure type of the molecular sieve material, but, usually, molecular sieves are synthesized using a structure directing agent (SDA), sometimes referred to as a template (or organic template) together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral units organize around the SDA to form the desired framework, and the SDA is often embedded within the pore structure of the zeolite crystals. In one or more embodiments, the crystallization of the first and second molecular sieves can be obtained by means of the addition of structure-directing agents/templates, crystal nuclei or elements.

As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the first and/or second molecular sieve (and advantageously, a suitable metal can be exchanged into both the first and second molecular sieves). According to one or more embodiments, the first molecular sieve is promoted with copper and the second molecular sieve is promoted with iron.

The promoter metal content of the catalyst, calculated as the oxide, is, in one or more embodiments, at least about 0.1 wt. %, based on the total weight of the calcined molecular sieve (including promoter) and reported on a volatile-free basis. In specific embodiments, the promoter metal of the first molecular sieve comprises Cu, and the Cu content, calculated as CuO is in the range of about 0.1 wt. % to about 5 wt. %, including about 5, 4, 3, 2, 1, 0.5, 0.25, and 0.1 wt. %, in each case based on the total weight of the calcined molecular sieve reported on a volatile free basis. In specific embodiments, the Cu content of the first molecular sieve, calculated as CuO, is in the range of about 2 to about 5 wt. % of the molecular sieve, based on the total weight of the calcined molecular sieve and reported on a volatile-free basis. In specific embodiments, the promoter metal of the second molecular sieve comprises Fe, and the Fe content, calculated as $Fe_2O_3$, is in the range of about 0.1 wt. % up to about 10 wt. %, including about 9, 8, 7, 6, 5, 4, 3, 2, 1, 0.5, 0.25, and 0.1 wt. %, in each case based on the total weight of the calcined molecular sieve reported on a volatile free basis. In other embodiments, the promoter metal of the second molecular sieve comprises Fe, and the Fe content, calculated as $Fe_2O_3$ is in the range of up to about 10 wt. %, including about 9, 8, 7, 6, 5, 4, 3, 2, and 1 wt. %, in each case based on the total weight of the calcined molecular sieve reported on a volatile free basis. In specific embodiments, the Fe content of the second molecular sieve, calculated as $Fe_2O_3$, is in the range of about 1 to about 5 wt. % of the molecular sieve, based on the total weight of the calcined molecular sieve and reported on a volatile-free basis.

In one or more embodiments, various different catalytic article designs are prepared using a first molecular sieve promoted with copper and second molecular sieve promoted with iron. The spatial relationship between the first and second molecular sieves can vary and, in particular, the design of the catalytic article with respect to the positioning of the first and second molecular sieves with respect to one another can vary. Exemplary designs include, but are not limited to, layered designs, zoned (e.g., laterally zoned) designs, and uniform mixture designs.

In certain embodiments, the catalytic article has a layered design, wherein a substrate is washcoated with the copper-promoted first molecular sieve to form a first layer, and the iron-promoted second molecular sieve is washcoated on top of the first layer to form a second layer. In other embodiments, the catalytic article is a layered article wherein a substrate is washcoated with the iron-promoted second molecular sieve to form a first layer, and the copper-promoted first molecular sieve is washcoated on top of the first layer to form a second layer. Although the catalytic articles advantageously can contain one layer of each of the first and second molecular sieves, it is noted that, in some embodiments, more than two layers can be included. Further, the layers are advantageously uniform and continuous over the surface of the substrate; however, the invention is not intended to be limited thereto.

In another embodiment, the copper-promoted first molecular sieve and the iron-promoted second molecular sieve are arranged in a laterally zoned configuration. As used herein, the term "laterally zoned" refers to the location of the copper-promoted first molecular sieve and the iron-promoted second molecular sieve relative to one another. Lateral means side-by-side, such that the copper-promoted first molecular sieve and the iron-promoted second molecular sieve are located one beside the other. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. In one or more embodiments, the catalytic article is in a laterally zoned configuration wherein the copper-promoted first molecular sieve is coated on a substrate upstream of the iron-promoted molecular sieve. In other embodiments, the catalytic article is in a laterally zoned configuration wherein the copper-promoted first molecular sieve is coated on a substrate downstream of the iron-promoted molecular sieve. According to one or more embodiments, the laterally zoned copper-promoted first molecular sieve and iron-promoted second molecular sieve can be arranged on the same substrate (i.e., a common substrate) or on different substrates, which may be at varying distances from each other.

Referring to FIG. 1, an exemplary embodiment of a laterally zoned system is shown. The catalytic article 10 is shown in a laterally zoned arrangement where the copper-promoted first molecular sieve 18 is located upstream of the iron-promoted second molecular sieve 20 on a common substrate 12. The substrate 12 has an inlet end 22 and an outlet end 24 defining an axial length L. In one or more embodiments, the substrate 12 generally comprises a plurality of channels 14 of a honeycomb substrate, of which only one channel is shown in cross-section for clarity. The copper-promoted first molecular sieve 18 extends from the inlet end 22 of the substrate 12 through less than the entire axial length L of the substrate 12. The length of the copper-promoted first molecular sieve 18 is denoted as first zone 18a in FIG. 1. The iron-promoted second molecular sieve 20 extends from the outlet end 24 of the substrate 12 through less than the entire axial length L of the substrate 12. The length of the iron-promoted second molecular sieve is denoted as the second zone 20a in FIG. 1.

It will be appreciated by one skilled in the art that the position of the copper-promoted first molecular sieve material and the iron-promoted second molecular sieve material relative to one another can be changed. Accordingly, in one or more embodiments, the catalytic article 10 may be provided in a laterally zoned arrangement where the iron-promoted second molecular sieve 18 is located downstream of the copper-promoted first molecular sieve 20 on a common substrate 12.

It will be appreciated that the length of the first zone and the second zone can be varied. In one or more embodiments, the first zone and second zone can be substantially equal in length. In other embodiments, the first zone can be shorter in length than the second zone or can be longer in length than the second zone. For example, in some embodiments, the first zone can have a length of about 10% to about 90% of the full length L of the substrate, such as about 10% to about 50% the full length of the substrate, about 40 to about 60% the full length of the substrate, or about 50% to about 90% of the full length of the substrate, with the second zone respectively covering the remainder of the length L of the substrate. In certain specific embodiments, the length of the first zone can be about 20%, 25%, 35% 40%, 60%, 65%, 75% or 80% of the length L of the substrate, with the second zone respectively covering the remainder of the length L of the substrate.

Figure 2:
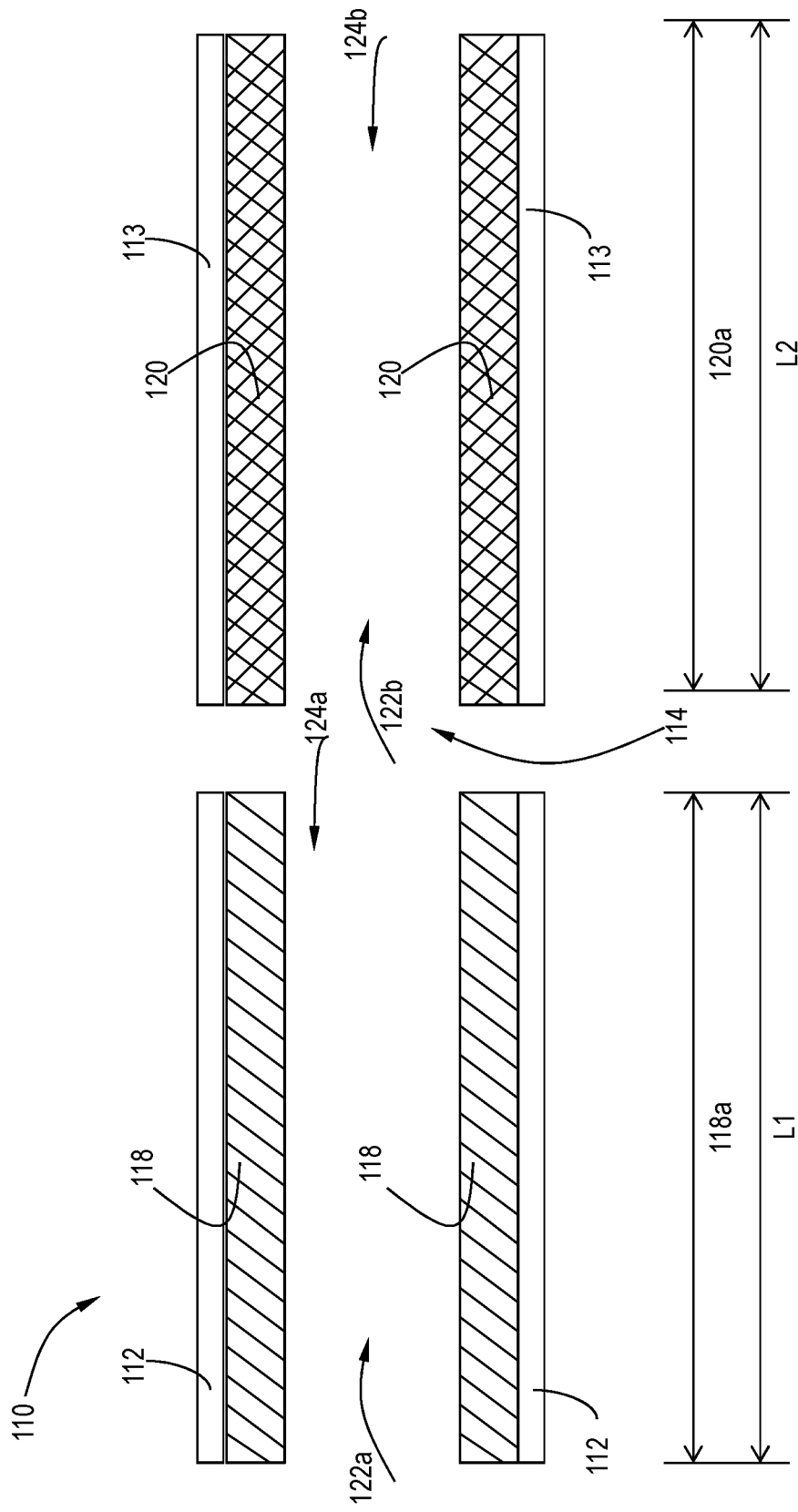
FIG. 2 shows a partial cross-sectional view of a catalytic article according to one or more embodiments.

Referring to FIG. 2, another embodiment of a laterally zoned catalytic article 110 is shown. The catalytic article 110 shown is a laterally zoned arrangement where the copper-promoted first molecular sieve 118 is located upstream of the iron-promoted second molecular sieve 120 on separate substrates 112 and 113. The copper-promoted first molecular sieve 118 is disposed on a substrate 112, and the iron-promoted second molecular sieve 120 is disposed on a separate substrate 113. The substrates 112 and 113 can be comprised of the same material or a different material and the sizes and shapes thereof can vary. The substrate 112 has an inlet end 122a and an outlet end 124a defining an axial length L1. The substrate 113 has an inlet end 122b and an outlet end 124b defining an axial length L2. In one or more embodiments, the substrates 112 and 113 generally comprise a plurality of channels 114 of a honeycomb substrate, of which only one channel is shown in cross-section for clarity. The copper-promoted first molecular sieve 118 extends from the inlet end 122a of the substrate 112 through the entire axial length L1 of the substrate 112 to the outlet end 124a. The length of the copper-promoted first molecular sieve 118 is denoted as first zone 118a in FIG. 2. The iron-promoted second molecular sieve 120 extends from the outlet end 124b of the substrate 113 through the entire axial length L2 of the substrate 113 to the inlet end 122b. The length of the iron-promoted second molecular sieve 120 is denoted as the second zone 120a in FIG. 2. The length of the zones 118a and 120a can be varied as described with respect to FIG. 1.

Again, it will be appreciated by one skilled in the art that the position of the copper-promoted first molecular sieve material and the iron-promoted second molecular sieve material relative to one another can be changed. Accordingly, in one or more embodiments, the catalytic article 110 may be provided in a laterally zoned arrangement where the copper-promoted first molecular sieve 118 is located downstream of the iron-promoted second molecular sieve 120 on different substrates 112 and 113. In one or more embodiments, the catalytic article is a uniform mixture of a copper-promoted first molecular sieve and an iron-promoted second molecular sieve having a d6r unit. The uniform mixture can be coated onto a substrate.

In specific embodiments, the copper-promoted first molecular sieves and the iron-promoted second molecular sieves having a d6r unit are present in a weight ratio of in the range of about 1:1 to about 4:1 by weight of the copper promoted first molecular sieve to the iron promoted molecular second sieve, including weight ratios of about 1:1; about 2:1; about 3:1; and about 4:1. In one or more specific embodiments, the weight ratio of the copper-promoted first molecular sieve to the iron-promoted second molecular sieve is in the range of about 1:1 to about 2:1. It is noted that the weight ratio of the copper-promoted first molecular sieve to the iron-promoted second molecular sieve is relevant for the layered, laterally zoned, and uniform mixture designs of the catalytic article. Cu:Fe ratios disclosed herein are weight ratios, based on the oxide forms (CuO and $Fe_2O_3$).

SCR Activity:

In one or more embodiments, the catalytic articles described herein can exhibit high $NO_x$ conversion. For example, a catalytic article comprising a washcoat containing Cu- and Fe-promoted molecular sieves as presented herein above can, in some embodiments, exhibit an aged $NO_x$ conversion at 200° C. of at least 50% measured at a gas hourly space velocity of 80000 $h^{-1}$. In specific embodiments, the catalytic article exhibits an aged $NO_x$ conversion at 450° C. of at least 70% measured at a gas hourly space velocity of 80000 $h^{-1}$. More specifically, in some embodiments, the aged $NO_x$ conversion at 200° C. can be at least 55% and at 450° C., at least 75% and even more specifically, in some embodiments, the aged $NO_x$ conversion at 200° C. is at least 60% and at 450° C., at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 5 h at 750° C.

Such SCR activity measurements have been demonstrated in the literature, see, for example PCT Application Publication No. WO 2008/106519 to Bull et al., which is incorporated herein by reference.

Furthermore, according to one or more embodiments, the catalytic articles provided herein are effective to lower $N_2O$ make. For example, when the weight ratio of the copper-promoted molecular sieve to the iron-promoted molecular sieve is in the range of about 1:1 to about 4:1, the $N_2O$ make is reduced compared to conventional Cu-promoted molecular sieve materials (i.e., Cu-SSZ13) and compared to conventional (i.e. small crystal) Cu—Fe promoted molecular sieve materials. When the weight ratio of the copper-promoted molecular sieve to the iron-promoted molecular sieve is about 5:1 and greater, there is an increase in $N_2O$ make compared to conventional Cu-promoted molecular sieve materials and compared to conventional (i.e. small crystal) Cu—Fe promoted molecular sieve materials. For example, see FIG. 6, which demonstrates $N_2O$ make for various materials. As shown, for one specific embodiment, the $N_2O$ make for a material as disclosed herein is about 7 ppm or less at 225° C. and about 4 ppm or less at 550° C. It is understood that $N_2O$ make can vary based on a number of parameters associated with use of the catalyst materials disclosed herein; however, advantageously, the materials disclosed herein can demonstrate lower $N_2O$ make than comparable materials (having lower crystal sizes and/or lower overall crystallinity) under a range of conditions of use.

The first and second molecular sieves according to embodiments of the invention may be provided in varying forms, including, but not limited to, the form of a powder or powders comprising the first and second molecular sieves or a sprayed material comprising one or both of the first and second molecular sieves, e.g., prepared using separation techniques such as decantation, filtration, centrifugation, and/or spraying. In general, the powder or sprayed material can be shaped without any other compounds, e.g. by suitable compacting, to obtain moldings of a desired geometry, e.g. tablets, cylinders, spheres, or the like.

By way of example, the powder(s) or sprayed material(s) can alternatively be admixed with or coated by suitable modifiers well known in the art. By way of example, modifiers such as silica, alumina, zeolites or refractory binders (for example a zirconium precursor) may be used. The powder or the sprayed material, optionally after admixing or coating by suitable modifiers, may be formed into a slurry, for example with water, which can then be deposited upon a suitable refractory carrier. See, for example, the types of carriers disclosed in WO 2008/106519 to Bull, which is incorporated herein by reference.

The first and second molecular sieves according to embodiments of the invention may also be provided in the form of extrudates, pellets, tablets or particles of any other suitable shape, for use as a packed bed of particulate catalyst, or as shaped pieces such as plates, saddles, tubes, or the like.

The Substrate:

In one or more embodiments, the first and second molecular sieves can be applied to a substrate (or more than one substrate, as referenced herein above) as a washcoat. As used herein, the term "substrate" refers to a monolithic material onto which the catalyst is placed, typically in the form of a washcoat. A washcoat is generally formed by preparing a slurry containing a specified solids content (e.g., 30-90% by weight) of catalyst (here, one or both of the first and second molecular sieves) in a liquid vehicle, which is then coated onto the substrate (or substrates) and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of a gas stream to be treated thereby.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

A ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

Substrates useful for the catalytic articles of embodiments of the present invention may also be metallic in nature and can be composed of one or more metals or metal alloys. Metallic substrates may be employed in various shapes such as pellets, corrugated sheet or monolithic form. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel based on the weight of the substrate.

Figure 3A:
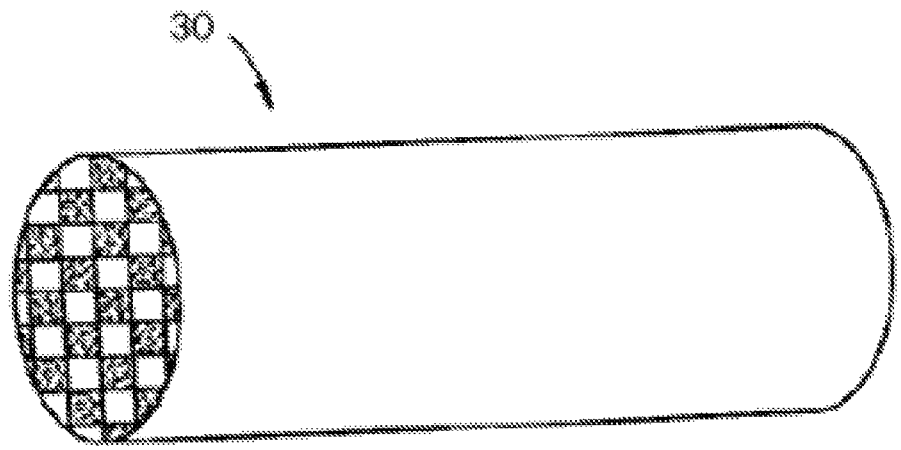
FIG. 3A shows a perspective view of a wall flow filter substrate.
Figure 3B:
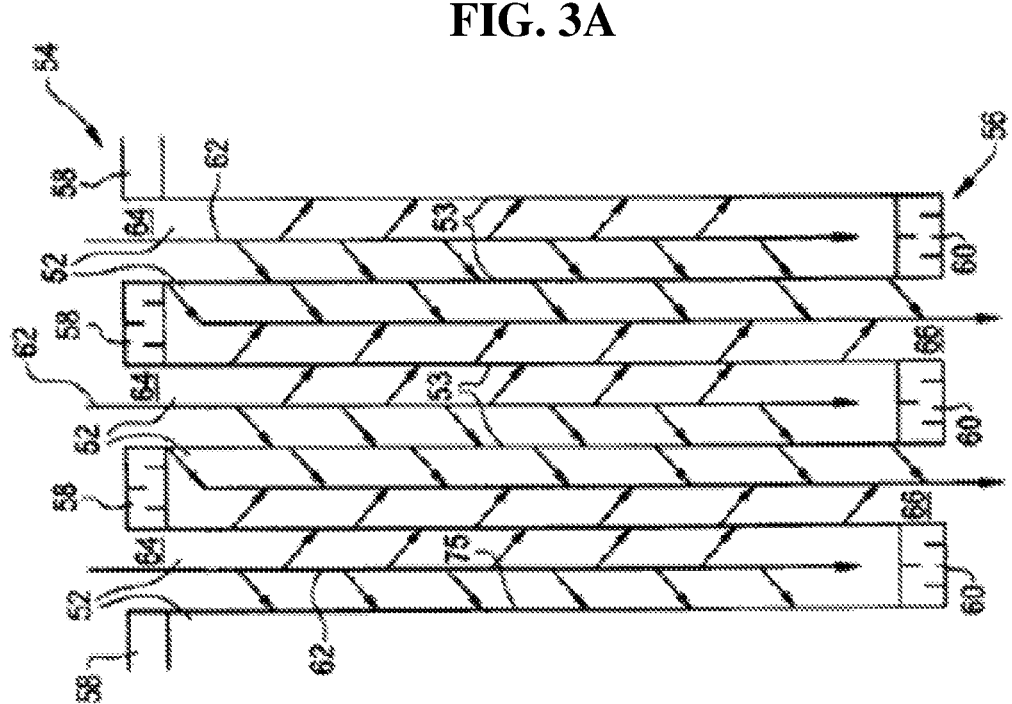
FIG. 3B shows a cross-sectional view of a section of a wall flow filter substrate.

In one or more embodiments, catalytic articles provided herein, comprising a copper-promoted first molecular sieve and an iron-promoted second molecular sieve, include such sieves coated on a flow through or wall-flow filter. FIGS. 3A and 3B illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

In one or more embodiments, wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. In other embodiments, wall flow substrates are formed of ceramic fiber composite materials. In specific embodiments, wall flow substrates are formed from cordierite and silicon carbide. Such materials are able to withstand the environment, particularly high temperatures, encountered in treating the exhaust streams.

In one or more embodiments, wall flow substrates include thin porous walled honeycombs monoliths through which the fluid stream passes without causing too great an increase in back pressure or pressure across the article. Normally, the presence of a clean wall flow article will create a back pressure of 1 inch water column to 10 psig. Ceramic wall flow substrates used in the system are formed of a material having a porosity of at least 50% (e.g., from 50 to 75%) having a mean pore size of at least 5 microns (e.g., from 5 to 30 microns). In one or more embodiments, the substrates have a porosity of at least 55% and have a mean pore size of at least 10 microns. When substrates with these porosities and these mean pore sizes are coated with the techniques described below, adequate levels of catalyst compositions can be loaded onto the substrates to achieve excellent $NO_x$ conversion efficiency. These substrates are still able to retain adequate exhaust flow characteristics, i.e., acceptable back pressures, despite the SCR catalyst loading. U.S. Pat. No. 4,329,162 to Pitcher is herein incorporated by reference with respect to the disclosure of suitable wall flow substrates.

Typical wall flow filters in commercial use are formed with lower wall porosities, e.g., from about 35% to 50%, than the wall flow filters utilized in the invention. In general, the pore size distribution of commercial wall flow filters is typically very broad with a mean pore size smaller than 17 microns.

Porous wall flow filters used in one or more embodiments provided herein are catalyzed in that the walls thereof have thereon or contained therein one or more catalytic materials as provided herein. Catalytic materials may be present on the inlet side of the catalytic article wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the catalytic article.

To coat the wall flow substrates with the catalyst material of one or more embodiments, the substrates can be immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Preparation of Catalyst:

Synthesis of Conventional CHA-Type Molecular Sieves

A molecular sieve having the CHA structure may be prepared according to various techniques known in the art, for example U.S. Pat. No. 4,544,538 to Zones and U.S. Pat. No. 6,709,644 to Zones, which are herein incorporated by reference in their entireties. It is noted that these molecular sieves are known to have a particle size of less than 0.5 microns.

Optionally $NH_4$-Exchange to Form $NH_4$-Chabazite:

Optionally, the obtained alkali metal zeolite is $NH_4$-exchanged to form $NH_4$-Chabazite. The $NH_4$-ion exchange can be carried out according to various techniques known in the art, for example, as disclosed in Bleken, F.; Bjorgen, M.; Palumbo, L.; Bordiga, S.; Svelle, S.; Lillerud, K.-P.; and Olsbye, U. Topics in Catalysis 52, (2009), 218-228, which is incorporated herein by reference. Synthesis of Large Crystal Molecular Sieves:

To prepare the first molecular sieves according to embodiments of the invention, highly crystalline molecular sieves with increased active sites are obtained by replacing the pH adjustment process of the conventional synthesis with a flocculation process to isolate molecular sieve crystals from the mother liquor. The first molecular sieves are prepared according to the procedure in patent application WO 2011/064186 to Bull, which is incorporated herein by reference. In short, the TMA-CHA is made by the following steps: (1) Crystallization of Chabazite using TMAOH (Trimethylammonium hydroxide) and TMAA (Trimethyl-1-adamantylammonium hydroxide) containing synthesis gel; (2) Separation of the chabazite product; and (3) Drying and calcination to remove organic template (TMAOH and TMAA). In a typical synthesis gel, Ludox AS40 will be used as silicon source while aluminum triisopropoxide will be used as an aluminum source. After the addition of the two templates TMAOH and TMAA, the resultant pH of the gel is approximately 14.2. The synthesis gel is transferred to an autoclave for hydrothermal crystallization at 170° C. for 24 h under an agitation rate of 200 RPM. After hydrothermal crystallization, the resultant suspension has a pH of 12.6. The suspension is admixed with deionized water and can be filtered with a porcelain suction filter directly or with the help of a flocculant. The wet product is then heated to a temperature of 120° C. in air for 4 hrs. The dried product is then further calcined in air at 600° C. for 5 hrs to remove the template and ensure a C content of less than 0.1 wt. %. The calcined product is then ready to be ion-exchanged with Cu or Fe to obtain the metal-containing catalyst.

Copper-Exchange or Iron-Exchange into Alkali Metal or $NH_4$-Chabazite to Form Metal-Chabazite:

Copper or iron is ion exchanged into alkali metal or $NH_4$ molecular sieves. In specific embodiments, copper or iron is ion exchanged into alkali metal or $NH_4$-Chabazite to form Cu-Chabazite or Fe-Chabazite. When copper acetate is used, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2.

According to an embodiment of the present invention, the molecular sieve material (which may be zeolitic material or non-zeolitic material) of the invention is used in a catalytic process. In general, the compositions and catalytic articles of the invention can be used in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, compositions and catalytic articles can be used to catalyze any one or more of methanol-to-olefin (MTO) reactions, ethylene-to-propylene (ETP) reactions, as well as of the co-reaction of methanol and ethylene (CME). The processes involve contacting the compounds with the compositions or catalytic articles described according to various embodiments of the invention, as disclosed herein.

Ion Exchange of Metal:

The first and second molecular sieve promoted with iron or promoted with copper may also be promoted with other metals. Suitable metals include, but are not limited to cobalt, nickel, cerium, platinum, palladium, rhodium and combinations thereof. The metal can be exchanged after manufacture of the zeolite. According to one or more embodiments, at least a portion of the metal can be included in the tailored colloid such that the tailored colloid contains the structure directing agent, a silica source, and alumina source and a metal ion (e.g., copper) source.

For additional promotion of SCR of oxides of nitrogen, a suitable alkaline earth or alkali metal is exchanged into the copper promoted molecular sieve material. Suitable alkaline earth or alkali metals include, but are not limited to, barium, magnesium, beryllium, calcium, strontium, radium, and combinations thereof. In specific embodiments, the alkaline earth or alkali metal component is selected from barium, magnesium, calcium and combinations thereof. In very specific embodiments, barium is exchanged into the copper promoted molecular sieve. The metal can be exchanged after the manufacture of the molecular sieve.

Method of Reducing $NO_x$:

In general, the first and second molecular sieves that are described above can be used as a molecular sieve, adsorbent, catalyst, catalyst support, or binder thereof. In one or more embodiments, the material is used as a catalyst.

The catalyst composition or catalytic article of the present invention can be used in a catalytic process involving the conversion of at least one compound comprising at least one nitrogen—oxygen bond. According to one or more embodiments of the present invention the composition or the catalytic article is used in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly specific embodiments of the present invention, the composition or catalytic article (comprising Cu and Fe) can be used in a catalytic process involving the conversion of at least one compound comprising at least one nitrogen-oxygen bond. The process can be accomplished by contacting the compound with the catalytic article according to an embodiment of the invention.

Moreover, another aspect of the invention is directed to a method of catalyzing a chemical reaction, comprising employing a catalyst material comprising a first and second molecular sieve, wherein the first molecular sieve is promoted with copper and the second molecular sieve is promoted with iron, the first and second molecular sieves having a d6r unit and cubic shaped crystals (e.g., substantially cubic shaped crystals) with an average crystal size of about 0.5 to about 2 microns.

Embodiments of the present invention also relate to a method for selectively reducing nitrogen oxides $NO_x$ by contacting a stream containing $NO_x$ with a catalyst material, composition or catalytic article according to the present invention under suitable reducing conditions. Certain embodiments relate to a method of oxidizing $NH_3$ (in particular, of oxidizing $NH_3$ slip in diesel systems) by contacting a stream containing $NH_3$ with a catalyst composition or catalytic article under suitable oxidizing conditions. Certain embodiments relate to a method of decomposing of $N_2O$ by contacting a stream containing $N_2O$ with a catalyst composition or catalytic article under suitable decomposition conditions. Certain embodiments relate to a method of controlling emissions in Advanced Emission Systems such as Homogeneous Charge Compression Ignition (HCCI) engines by contacting an emission stream with a composition or catalytic article under suitable conditions. Certain embodiments relate to a fluid catalytic cracking (FCC) process wherein the composition disclosed herein is employed as additive. Certain embodiments relate to a method of converting an organic compound by contacting said compound with the composition or catalytic article under suitable conversion conditions. Certain embodiments relate to a "stationary source" process wherein a composition or catalytic article is employed. Such stationary source processes are understood to be distinguished from "mobile source" processes. Exemplary stationary source processes include, but are not limited to, large SCR units attached to and dealing with $NO_x$ emissions from a coal-fired power plant.

Embodiments of the present invention also relate to a method for selectively reducing nitrogen oxides ($NO_x$), wherein a gaseous stream containing nitrogen oxides $NO_x$, specifically also containing ammonia and/or urea, is contacted with the composition or catalytic article of one or more embodiments disclosed herein, for example, in the form of a molded catalytic article, specifically as a molded catalytic article wherein the washcoat is deposited on a suitable refractory carrier, still more specifically on a "honeycomb" carrier.

In particular, the catalyst materials and articles disclosed herein can be effective in the selective catalytic reduction of nitrogen oxides. For example, wherein the selective catalytic reduction catalytic article comprises a washcoat deposited on a substrate, the washcoat comprising the first molecular sieve promoted with copper and the second molecular sieve promoted with iron, the first and second molecular sieves having a d6r unit and wherein at least the first molecular sieves comprise cubic shaped crystals with an average crystal size in the range of 0.5 to 2 microns, the material can be employed as a catalytically active material in the presence of ammonia or urea.

The nitrogen oxides which are reduced using the catalytic article according to embodiments of the present invention may be obtained by any process, e.g. by collection as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Various reducing agents can be employed in the context of SCR. For example, while ammonia is the reducing agent of choice for stationary power plants, urea is the reducing agent of choice for mobile SCR systems. Typically, in certain embodiments disclosed herein, an SCR system is integrated in the exhaust gas treatment system of a vehicle which may typically contain the following main components: a selective catalytic reduction catalyst comprising a first molecular sieve promoted with copper and a second molecular sieve promoted with iron, the first and second molecular sieves having a d6r unit and the first molecular sieves having cubic shaped crystals with an average crystal size in the range of 0.5 to 2 microns (including embodiments wherein both the first and second molecular sieves have cubic shaped crystals with an average crystal size in the range of 0.5 to 2 microns); a urea storage tank; a urea pump; a urea dosing system; a urea injector/nozzle; and a respective control unit.

As used herein, the term "stream" or "gas stream" broadly refers to any combination of flowing gas that may contain solid or liquid particulate matter. In certain embodiments, the streams referred to herein comprise at least some percentage of nitrogen oxides ($NO_x$). The amount of such $NO_x$ and the content (balance) of such gas streams can vary. The term "gaseous stream" or "exhaust gas stream" means a stream comprising gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

More specific embodiments pertain to the use of a composition or catalytic article for removal of nitrogen oxides ($NO_x$) from exhaust gases of internal combustion engines and, in particular, of diesel engines, which operate at combustion conditions with air in excess of that required for stoichiometric combustion, i.e. under lean conditions.

Exhaust Gas Treatment System:

Another aspect of the invention is directed to an exhaust gas treatment system. In one or more embodiments, the exhaust gas treatment system comprises an exhaust gas stream optionally containing a reductant like ammonia, urea and/or a hydrocarbon, and in specific embodiments, ammonia and/or urea, and a selective catalytic reduction catalyst comprising a first molecular sieve promoted with copper and a second molecular sieve promoted with iron, the first and second molecular sieves having a d6r unit and at least the first molecular sieves comprising cubic shaped crystals with an average crystal size in the range of 0.5 to 2 microns. The catalyst can, in some embodiments, be effective in destroying at least a portion of the ammonia in the exhaust gas stream.

In one or more embodiments, the catalyst material can be disposed on a substrate, for example, a soot filter. The soot filter, catalyzed or non-catalyzed, may be upstream or downstream of the catalyst material. In one or more embodiments, the system can further comprise a diesel oxidation catalyst. In specific embodiments, the diesel oxidation catalyst is located upstream of the catalyst material described herein. In other specific embodiments, the diesel oxidation catalyst and the catalyzed soot filter are upstream from the catalyst material described herein.

In specific embodiments, the exhaust is conveyed from the engine to a position downstream in the exhaust system, and in more specific embodiments, containing $NO_x$, where a reductant is added and the exhaust stream with the added reductant is conveyed to the catalyst.

For example, a catalyzed soot filter, a diesel oxidation catalyst, and a reductant are described in WO 2008/106519 to Bull, which is herein incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation (AMOX) catalyst may, in some embodiments, be provided downstream of the catalyst material to remove any slipped ammonia from the system. In specific embodiments, the AMOX catalyst may comprise a platinum group metal such as platinum, palladium, rhodium, or combinations thereof.

Such AMOX catalysts are useful in exhaust gas treatment systems including an SCR catalyst. As discussed in commonly assigned U.S. Pat. No. 5,516,497 to Speronello et al., the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalyst can be a SCR catalyst comprising a zeolite and the second catalyst can be an AMOX catalyst comprising a zeolite.

AMOX and/or SCR catalyst composition(s) can be coated on a flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of Large Crystal Cu-CHA

A CuCHA powder catalyst was prepared by crystallization of chabazite using TMAOH (tetramethylammonium hydroxide) and TMAA (trimethyl-1-adamantylammonium hydroxide) containing synthesis gel, separation of the chabazite product, drying, and calcination to remove the organic template (TMAOH and TMAA). Ludox AS40 was used as a silicon source, while aluminum triisopropoxide was used as an aluminum source. After the addition of the two templates, the resultant pH of the gel was approximately 14.2. The synthesis gel was transferred to an autoclave for hydrothermal crystallization at 170° C. for 24 h under an agitation rate of 200 RPM.

After hydrothermal crystallization, the resultant suspension had a pH of 12.6. The suspension was admixed with deionized water and was filtrated with a porcelain suction filter directly or with the help of a flocculant. The wet product was then heated to a temperature of 120° C. in air for 4 hrs. The dried product was then further calcined in air at 600° C. for 5 hrs to remove the template and ensure a C content less than 0.1 wt. %. The calcined product was then ready to be ion-exchanged with Cu to obtain the metal-containing catalyst.

An ion-exchange reaction between the calcined CHA and the copper ions was carried out by agitating the slurry at about 80° C. for about 1 hour. The resulting mixture was then filtered to provide a filter cake, and the filter cake was washed with deionized water in three portions until the filtrate was clear and colorless, and the washed sample was dried.

The obtained CuCHA catalyst comprised CuO at a range of about 3 to about 3.5% by weight, as determined by ICP analysis. A CuCHA slurry was prepared to 40% target solids. The slurry was milled and a binder of zirconium acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at about 400° C. for 1 hour. The coating process was repeated once to obtain a target washcoat loading of in the range of 2-3 g/in³.

Example 2—Preparation of Fe-CHA

A FeCHA powder catalyst was prepared by ion-exchanging calcined CHA (traditionally produced, having a crystal size of less than 0.5 microns), at 80° C. for 2 hours and pH 4. The mixture was then washed with deionized water, filtered, and vacuum/air dried. A slurry was prepared of Fe-CHA to 45% target solids, and 2.5% ZrOAc binder was added based on the zeolite solids. The slurry was mixed well and then milled to $D_{90}$% of 7-10 microns.

Example 3—Preparation of Large Crystal Fe-CHA

A FeCHA powder catalyst was prepared by ion-exchanging the calcined CHA prepared according to the process of Example 1, at 80° C. for 2 hours and pH 4. The mixture was then washed with deionized water, filtered, and vacuum/air dried. A slurry was prepared of Fe-CHA to 45% target solids, and 2.5% ZrOAc binder was added based on the zeolite solids. The slurry was mixed well and then milled to $D_{90}$% of 7-10 microns.

Example 4—Preparation of Washcoat Containing FeCHA and Large Crystal CuCHA

Figure 4:
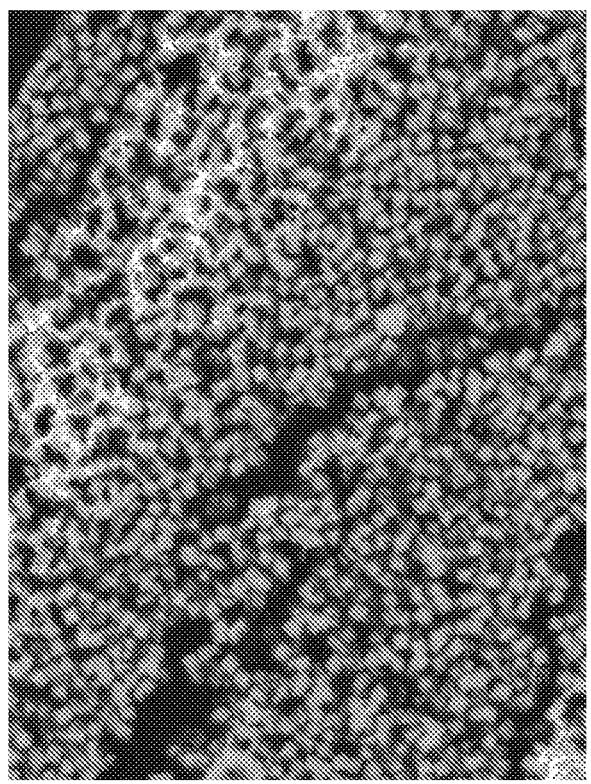
FIG. 4 is a SEM image of crystal morphology for material according to the Examples.

The Fe-CHA Example 2 slurry was then added to the Cu-CHA Example 1 slurry in a weight ratio of 2:1 Cu-CHA:Fe-CHA. The slurries were mixed well, and the pH was adjusted to 4.5 with 15% ammonium hydroxide solution. The mixture was then coated onto to substrates to a washcoat loading of 3 g/in³. The washcoat was dried under air at 130° C. for 5 min. A second coat was then applied. No calcination was done between coats. After the final coating, the substrate was calcined at 450° C. for 1 hour. As illustrated in the SEM image of FIG. 4, the large crystal Cu—Fe-CHA material had cubic shaped crystals with a crystal size of about 1 micron (after calcining).

Example 5—Preparation of Washcoat Containing Large Crystal FeCHA and Large Crystal CuCHA The Fe-CHA Example 3 slurry was added to the Cu-CHA Example 1 slurry in a weight ratio of 2:1 Cu-CHA:Fe-CHA. The slurries were mixed well, and the pH was adjusted to 4.5 with 15% ammonium hydroxide solution. The mixture was then coated onto substrates to a washcoat loading of 3 g/in³. The washcoat was dried under air at 130° C. for 5 min. A second coat was then applied. No calcination was done between coats. After the final coating, the substrate was calcined at 450° C. for 1 hour. The Fe-CHA Example 3 slurry was then added to the Cu-CHA Example 1 slurry in a weight ratio of 2:1 Cu-CHA:Fe-CHA. The slurries were mixed well, and the pH was adjusted to 4.5 with 15% ammonium hydroxide solution. The mixture was then coated onto to substrates to a washcoat loading of 3 g/in³. The washcoat was dried under air at 130° C. for 5 min. A second coat was then applied. No calcination was done between coats. After the final coating, the substrate was calcined at 450° C. for 1 hour. The large crystal Cu—Fe-CHA material had cubic shaped crystals with a crystal size of about 1 micron.

Comparative Example 6—Small Crystal CuCHA

A washcoat was prepared with a Cu-CHA sample having a crystal size of less than 0.5 microns. A washcoat was prepared on a core sample as described above for Example 5.

Comparative Example 7—Small Crystal Cu—Fe-CHA

A blended washcoat was prepared by mixing a Cu-CHA sample with a Fe-CHA sample. It is noted that the Cu-CHA and Fe-CHA samples had crystal sizes less than 0.5 microns.

Example 8—Testing

Nitrogen oxide selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 $hr^{-1}$ across a 150° C. to 460° C. temperature range.

The samples were hydrothermally aged in the presence of 10% $H_2O$ at 750° C. for 5 hours, followed by measurement of the nitrogen oxide SCR efficiency and selectivity by the same process as outlined above for the SCR evaluation on a fresh catalyst core.

Figure 5:
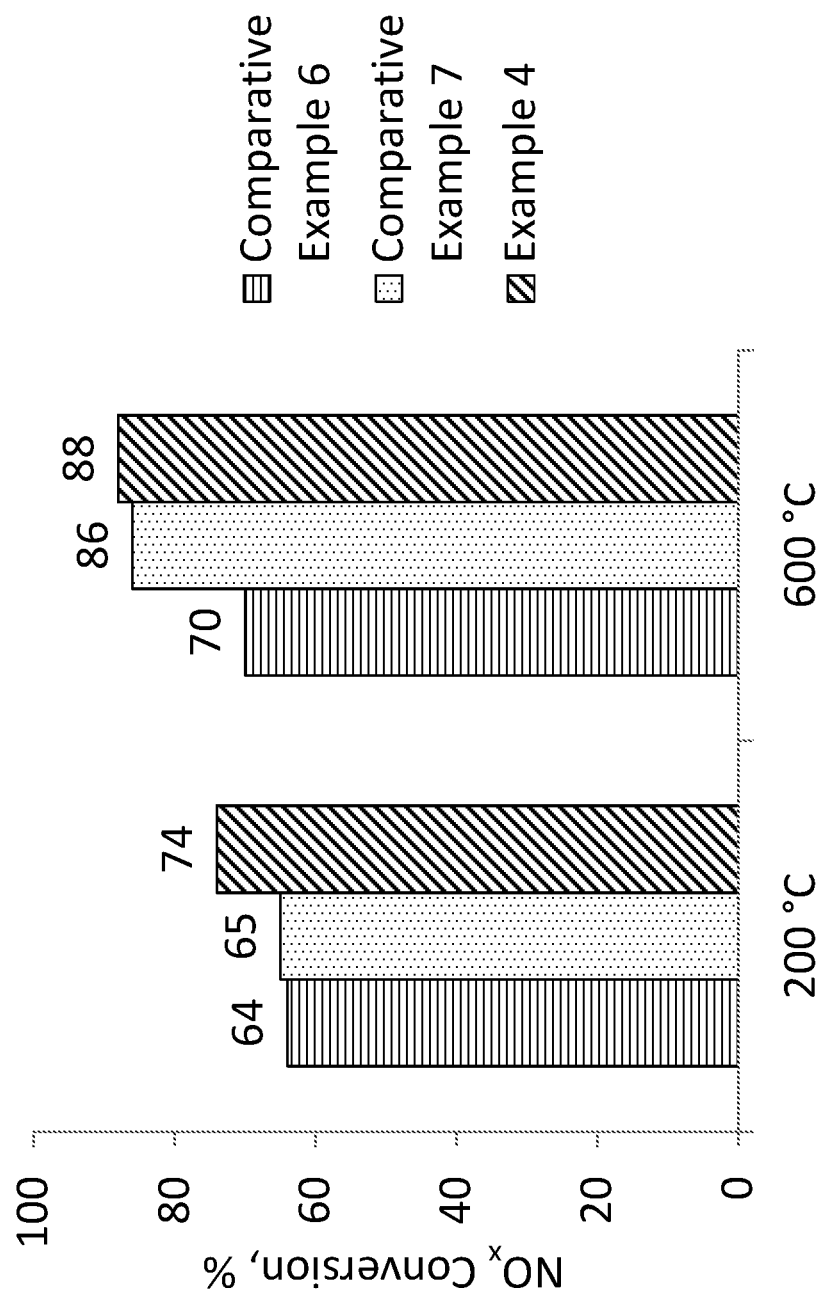
FIG. 5 is a bar graph comparing $NO_x$ conversions for catalysts according to the Examples.

FIG. 5 is a bar graph showing the $NO_x$ conversion versus temperature for the samples, which shows that the mixture of large crystal Cu-CHA+Fe-CHA (Example 3) exhibited the best performance.

Figure 6:
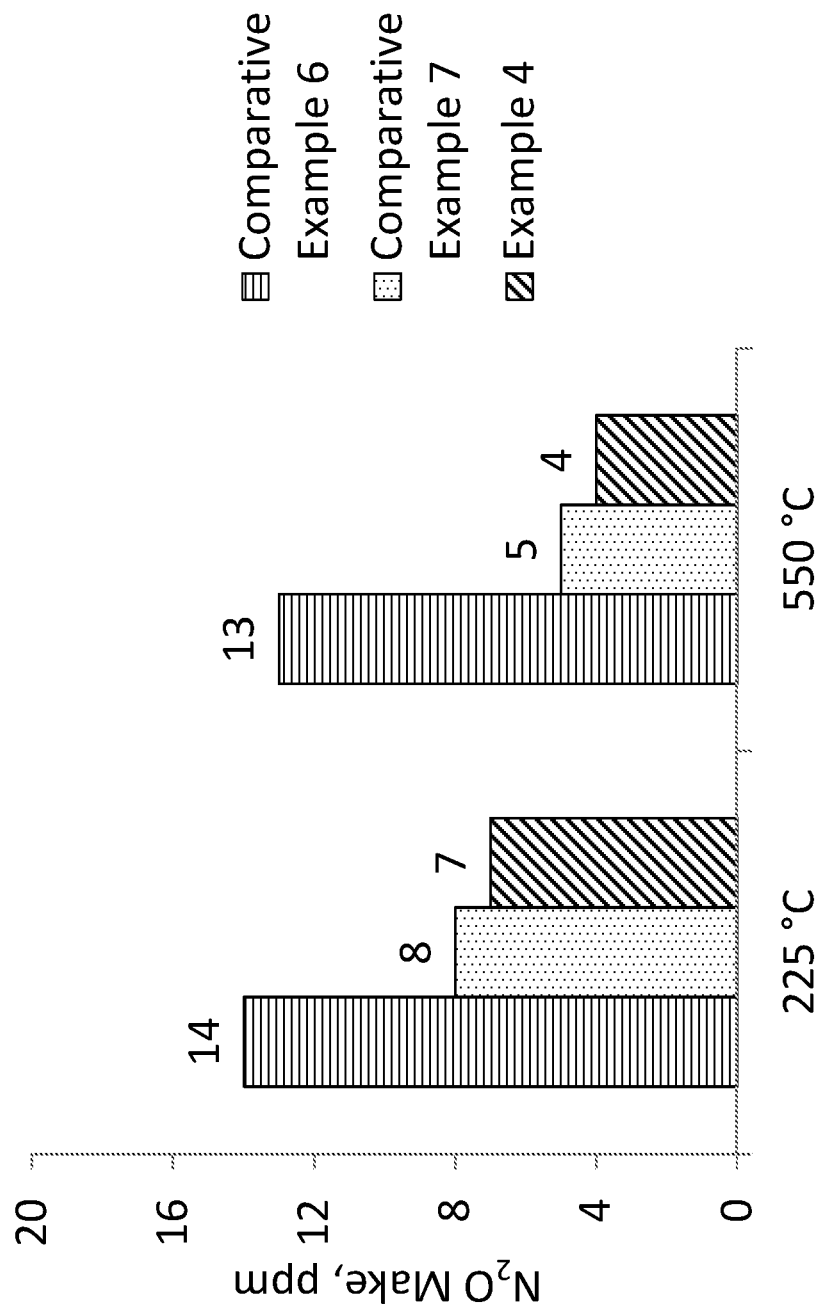
FIG. 6 is a bar graph comparing $N_2O$ make for catalysts according to the Examples.

FIG. 6 is a bar graph showing the $N_2O$ make versus temperature for the samples. FIG. 6 illustrates that the inventive mixture of large crystal Cu-CHA+Fe-CHA (Example 3) exhibits lower $N_2O$ make versus the small crystal Cu-CHA and the small crystal Cu—Fe-CHA.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article comprising a substrate having at least one washcoat thereon so as to contain both a first molecular sieve promoted with copper and a second molecular sieve promoted with iron, the first and second molecular sieves having a d6r unit and the first molecular sieve having cubic shaped crystals with an average crystal size of about 0.5 to about 2 microns, wherein the weight ratio of the copper-promoted molecular sieve to the iron-promoted molecular sieve is about 1:1 to about 4:1, the catalytic article effective to catalyze the reduction of nitrogen oxides in the presence of a reductant, wherein the catalytic article has an $N_2O$ make of about 7 ppm or less at 225° C. and an $N_2O$ make of about 4 ppm or less at 550° C. after hydrothermal aging in the presence of 10% $H_2O$ at 750° C. for 5 hours.

2. The catalytic article of claim 1, wherein the first and second molecular sieves each have a structure type independently selected from the group consisting of AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

3. The catalytic article of claim 2, wherein the first and second molecular sieves each are 8-ring small pore molecular sieves independently selected from AEI, AFT, AFX, CHA, EAB, ERI, KFI, LEV, SAS, SAT, and SAV.

4. The catalytic article of claim 3, wherein the first and second molecular sieves each have a structure type independently selected from AEI, CHA, and AFX.

5. The catalytic article of claim 4, wherein each of the first and second molecular sieves has a CHA structure type.

6. The catalytic article of claim 5, wherein the first and second molecular sieves having the CHA structure type are independently selected from an aluminosilicate zeolite, a borosilicate, a gallosilicate, a SAPO, an AlPO, a MeAPSO, and a MeAPO.

7. The catalytic article of claim 5, wherein the first and second molecular sieves having the CHA structure type are independently selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

8. The catalytic article of claim 1, wherein the weight ratio of the copper-promoted molecular sieve to the iron-promoted molecular sieve is about 1:1 to 2:1.

9. The catalytic article of claim 1, wherein the catalytic article is effective to catalyze the selective catalytic reduction of nitrogen oxides in the presence of a reductant at temperatures of about 200° C. to about 600° C.

10. The catalytic article of any of claim 1, wherein the first and second molecular sieves each have a CHA structure type having a silica to alumina ratio of about 10 to about 50.

11. The catalytic article of claim 1, wherein the copper is present in an amount of about 0.1 to about 5 wt. % based on the overall weight of the washcoat.

12. The catalytic article of claim 1, wherein the iron is present in an amount of about 0.1 to about 10 wt. % based on the overall weight of the washcoat.

13. The catalytic article of claim 1, wherein the iron is present in an amount of about 0.1 to about 5 wt. % based on the overall weight of the washcoat.

14. The catalytic article of claim 13, wherein the iron is present in an amount of about 1 to about 3 wt. % based on the overall weight of the washcoat.

15. The catalytic article of claim 1, wherein the first molecular sieves have an average crystal size of about 0.8 micron to about 1.2 micron.

16. The catalytic article of claim 1, wherein the first molecular sieves have an average crystal size of about 1 micron.

17. The catalytic article of claim 1, wherein the second molecular sieves have cubic shaped crystals with an average crystal size of about 0.5 to about 2 microns.

18. The catalytic article of claim 17, wherein the second molecular sieves have an average crystal size of about 0.8 micron to about 1.2 micron.

19. The catalytic article of claim 1, wherein the first and second molecular sieves have an average crystal size of about 0.8 micron to about 1.2 micron.

20. The catalytic article of claim 1, wherein the first and second molecular sieves have average crystal sizes of about 1 micron.

21. The catalytic article of claim 1, wherein the first molecular sieve and the second molecular sieve are in a laterally zoned or layered configuration with respect to one another or are in a uniform mixture with one another.

22. The catalytic article of claim 1, wherein the first molecular sieve and the second molecular sieve are contained in the same washcoat.

23. The catalytic article of claim 1, wherein the first molecular sieve and the second molecular sieve are in separate washcoats.

24. The catalytic article of claim 1, wherein the substrate comprises a filter.

25. The catalytic article of claim 24, wherein the filter is a wall flow filter.

26. The catalytic article of claim 24, wherein the substrate is a flow through substrate.

27. A method for selectively reducing nitrogen oxides (NOx), the method comprising contacting a gas stream containing NOx with the catalytic article of claim 1.

28. The method of claim 27, wherein the second molecular sieves have cubic shaped crystals with an average crystal size of about 0.5 to about 2 microns.

29. The method of claim 27, wherein the first and second molecular sieves have an average crystal size of about 0.8 micron to about 1.2 micron.

30. The method of claim 27, wherein the first and second molecular sieves have average crystal sizes of about 1 micron.

31. The method of claim 27, wherein the weight ratio of the copper-promoted molecular sieve to the iron-promoted molecular sieve is about 1:1 to about 2:1.

32. The method of claim 27, wherein the first molecular sieve and the second molecular sieve are contained in the same washcoat.

33. The method of claim 27, wherein the first molecular sieve and the second molecular sieve are in separate washcoats.

34. The method of claim 27, wherein the first molecular sieve and the second molecular sieve are in a laterally zoned or layered configuration with respect to one another or are in a uniform mixture with one another.

35. A system for treating exhaust gas from a lean burn engine containing NOx, the system comprising the catalytic article of claim 1 and at least one other exhaust gas treatment component.

* * * * *